United States Patent [19]
Wright

[11] Patent Number: 6,134,231
[45] Date of Patent: Oct. 17, 2000

[54] UPLINK CHANNEL PUNCTURING FOR REDUCED INTERFERENCE WITHIN A WIRELESS DATA COMMUNICATIONS NETWORK

[75] Inventor: Andrew S. Wright, Vancouver, Canada

[73] Assignee: Telefonaktiebolaget LM Ericsson (publ), Stockholm, Sweden

[21] Appl. No.: 08/907,517

[22] Filed: Aug. 8, 1997

[51] Int. Cl.[7] .......................... H04B 7/212; H04L 12/413
[52] U.S. Cl. .......................... 370/348; 370/443; 370/445; 455/455
[58] Field of Search ................... 455/450, 466, 455/62, 434, 445, 458, 453, 422, 452, 455; 370/337, 338, 445, 447, 461, 462, 347, 348, 449, 345, 346, 458, 342, 443, 448; 340/825.07, 825.08

[56] References Cited

U.S. PATENT DOCUMENTS

| | | | |
|---|---|---|---|
| 4,234,952 | 11/1980 | Gable et al. | 370/448 |
| 5,142,533 | 8/1992 | Crisler et al. | 370/349 |
| 5,166,929 | 11/1992 | Lo | 370/448 |
| 5,461,627 | 10/1995 | Rypinski | 370/346 |
| 5,513,183 | 4/1996 | Kay et al. | 370/337 |
| 5,521,925 | 5/1996 | Merakos et al. | 370/236 |
| 5,537,395 | 7/1996 | Alles et al. | 370/337 |
| 5,640,395 | 6/1997 | Hamalainen et al. | 370/322 |
| 5,673,259 | 9/1997 | Quick, Jr. | 370/342 |
| 5,722,043 | 2/1998 | Pappaport et al. | 455/452 |
| 5,778,316 | 7/1998 | Persson et al. | 455/434 |
| 5,790,551 | 8/1998 | Chan | 370/458 |

FOREIGN PATENT DOCUMENTS

| | | |
|---|---|---|
| WO 94/10767 | 5/1994 | WIPO . |
| WO 96/37079 | 11/1996 | WIPO . |

OTHER PUBLICATIONS

Patent Abstracts of Japan, Publ. No. 08331045 (Dec. 13, 1996), Appl. No. 07160166.

European Patent Office, Standard Search Report, Apr. 8, 1998, File RS 100189.

*Primary Examiner*—Hassan Kizou
*Assistant Examiner*—John Pezzlo
*Attorney, Agent, or Firm*—Jenkens & Gilchrist, P.C.

[57] ABSTRACT

A multiple access communications channel is punctured at randomly selected time periods to reduce system-wide interference levels. During the puncturing time period, all users are restricted from accessing the communications channel. Puncturing is implemented as a restriction to communications channel access in addition to any other restrictions implicated by use of a particular multiple access protocol. Thus, a control flag on a forward channel is set not only when a reverse channel is either busy with or reserved for the communications of another user, but also when the reverse channel is closed by puncturing to all user communications.

22 Claims, 3 Drawing Sheets

UPLINK CHANNEL PUNCTURING FOR REDUCED INTERFERENCE WITHIN A WIRELESS DATA COMMUNICATIONS NETWORK

BACKGROUND OF THE INVENTION

1. Technical Field of the Invention

The present invention relates to wireless (cellular) data communications networks and, in particular, to a method for reducing interference within a wireless data communications network.

2. Description of Related Art

Wireless data communications networks divide a large service area into a number of smaller discrete geographical areas called "cells" each typically ranging in size from about one-half to about twenty kilometers in diameter. Each cell is at least contiguous and/or overlapping with multiple adjacent cells to provide substantially continuous coverage throughout the service area. A base station including a plurality of transceivers capable of operating independently on different assigned radio frequencies is provided for each of the cells. Via the transceivers, the base stations engage in simultaneous communications with plural mobile stations operating within the area of the associated cell. The base stations further communicate via communications links with a central control and routing station, commonly referred to as a mobile data intermediate system (MDIS), which functions to selectively connect data communications to the mobile stations through the base stations and, in general, control operation of the network.

Each cell is assigned use of a predetermined set of frequencies from the cellular frequency band for use in providing its control and data (traffic) channels. The assignment is typically made in accordance with a certain frequency plan. The frequencies used for the control channel and traffic channels assigned to a given cell are preferably spaced apart from each other across the frequency spectrum of the cellular frequency band. This serves to minimize the instances and adverse affects of adjacent channel interference.

Because only a limited number of frequencies are available in the cellular frequency band, the same frequencies that are assigned to one cell are also assigned to (i.e., re-used by) other cells in distant parts of the service area. Typically, adjacent cells are not assigned to use the same frequency by the frequency plan. Furthermore, the power levels of the signal transmissions on any given frequency are limited in strength so as to limit propagation beyond the cell area. The foregoing precautions serve to reduce the instances of co-channel interference caused by re-use of that same frequency in a distant cell. It is further noted that careful power level control and distance assignment also assists in reducing the instances of adjacent channel interference.

In spite of the precautions taken by service providers in the frequency plan assignment for a frequency re-use wireless (cellular) data communications network and in the regulation of network operation, it is known that instances of co-channel interference do occur. This interference may be affected by a number of factors including: terrain irregularities; radio propagation changes; fading; multipath propagation; reflection; existence of human and natural obstructions; the number of available transceivers per cell; and variations in demand. This interference often adversely affects network operation by, for example, degrading quality on the traffic channels or interfering with the transmission and reception of control signals on the control channels.

One commonly employed frequency plan assignment for cellular communications networks comprises a seven-level plan wherein the cells covering the service area are grouped into clusters of seven cells each, and the available frequencies are divided amongst and re-used within each of the clusters. While providing satisfactory operation, interference concerns still exist with respect to the re-use of same frequencies in distant cells. Reduction in interference may be obtained by increasing the number of frequencies that are re-used in each cluster. However, such additional frequencies may not be available due to the limited nature of the allocated frequency spectrum for wireless cellular communications, and in some instances the addition of frequencies does not completely solve the interference problem. Accordingly, alternative mechanisms must be employed for reducing interference.

One solution is to partition each single frequency channel in the time domain to provide plural orthogonal logical channels which are used at different times (i.e., time division multiplexing). This solution advantageously does not require the allocation of additional frequencies from the wireless spectrum as the plural logical channels may share the same frequency. Time re-use is furthermore a particularly appealing solution because the level of mutual interference between the plural created logical channels is zero (i.e., the channels are orthogonal). Other solutions include spread spectrum code division and antenna sectoring (a form of space division) for providing additional channels within a frequency plan. Mutual interference with these solutions is not zero, but a sufficient level of interference suppression is provided to better support communications.

A known data communications network is the AT&T pACT'97 system whose design is based around the use of seven 12.5 kHz full duplex frequencies each supporting an eight kilobit per second (kbps) data rate. In this system, a 2× time and a 7× frequency re-use plan is implemented (i.e., two logical time division channels per frequency, and seven frequencies per cluster). Although a total of fourteen logical channels may be created with this plan, only a twelve level plan is implemented. The remaining two channels are held in reserve for use in specific geographical areas where interference is especially severe (such as hill tops). Each logical channel in the twelve level plan for the pACT'97 system supports an effective 4 kbps data rate.

In the pACT'97 system, a symmetric frequency assignment is provided with respect to the uplink and downlink. By this it is meant that the same number of frequencies are allocated for use in uplink communications as in downlink communications. Such symmetry is not, however, a requirement for operation of a wireless data communications network. For the narrowband personal communications service (NPCS), for example, the Federal Communications Commission (FCC) has defined an asymmetric frequency assignment comprising three 12.5 kHz frequencies on the downlink and one 12.5 kHz frequency on the uplink.

A need has arisen to extend the narrowband two-way paging and messaging protocol of the pACT'97 system to operate in the asymmetric frequency assignment environment of the NPCS system. The pACT'97 system design, however, is premised around the use of seven symmetric full duplex channel pairs (with twelve level re-use) which is not supported the NPCS asymmetric frequency assignment design. A direct application of the pACT'97 system design to the NPCS asymmetric frequency assignment design would require that the pACT'97 system twelve level re-use plan be applied to both the uplink and the downlink. As only one uplink channel is provided by the NPCS asymmetric frequency assignment design, and the pACT'97 system design requires full duplex operation, one proposed solution for supporting a twelve level re-use plan on the single frequency NPCS uplink is through a twelve level time division scheme. This proposed solution is unsatisfactory because the 8 kbps data rate would be reduced to a 0.667 kbps data rate per logical channel resulting in a large message latency. Is it further noted that the three downlink frequencies would require only a four level time division scheme to support the twelve level re-use plan. The proposed solution, which then would instead require use of twelve level time division on the downlink as well, is further unsatisfactory because downlink bandwidth (capacity) is wasted due to the constraints imposed by the limited uplink bandwidth (capacity).

There is a need then for a technique which would allow a lower level time division scheme to be implemented when a communications protocol designed for a symmetric frequency assignment design is utilized by a wireless data communications network having an asymmetric frequency assignment design. In particular, the need is for a technique to more efficiently allow the asymmetric frequency assignment design of the NPCS system to support the narrowband two-way paging and messaging protocol of the pACT'97 system. A technique which would allow for the use of a lower level time division scheme on the single frequency channel uplink would be ideal.

SUMMARY OF THE INVENTION

To address the foregoing and other needs of the prior art, the present invention provides for a puncturing of a multiple access communications channel. The puncturing comprises a randomly selected time period during which all users are restricted from accessing the communications channel. This puncturing time period acts as a restriction to communications channel access in addition to any other restrictions implicated by use of a particular multiple access protocol. By preventing users from accessing the communications channel during the puncturing time period, a lowering of interference on the communications channel results in those situations where re-use of the channel is implemented.

In a generic implementation of the present invention, a given multiple access communications protocol includes a flag which is indicative not only of the busy or reserved condition of the communications channel to thus restrict use of the channel to one particular user, but also of the activation of the puncturing time period which prohibits use of the channel by all users. For a first embodiment carrier sense multiple access protocol governed communications channel, a control flag on a forward channel is set not only when a reverse channel is busy with the communications of another user, but also when the reverse channel is closed to all user communications. Similarly, for a second embodiment packet reservation multiple access protocol governed communications channel, the control flag on the forward channel is set not only when the reverse channel has been reserved for the communications of another user, but also when the reverse channel is closed to all user communications.

The present invention is primarily directed to communications systems supporting packet data services. It may, however, be extended to any communications system where short delays to message transmission are of no or little consequence to end users. Furthermore, although not generally applicable to voice/telephony communications services and systems due to their sensitivity to time delays, the present invention may be extended to such systems when appropriate.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

There are a plurality of radio frequencies in the cellular frequency band available to wireless (cellular) data communications network providers for use in communicating with mobile stations. A wireless network can cover a large geographic region, and in many instances there will be a need for a large number of cells. Often times, the number of cells needed exceeds the number of cells provided by dividing the available frequencies amongst the cells in such a manner as to handle expected subscriber usage per cell. In such a case there are simply not enough frequencies in the cellular frequency band for unique assignment to the included cells. In order then to provide sufficient call handling capacity throughout the service area, the cells are grouped into clusters of cells and the frequencies in the cellular frequency band are divided amongst and re-used in each of the clusters in accordance with a certain frequency assignment plan.

Figure 1:
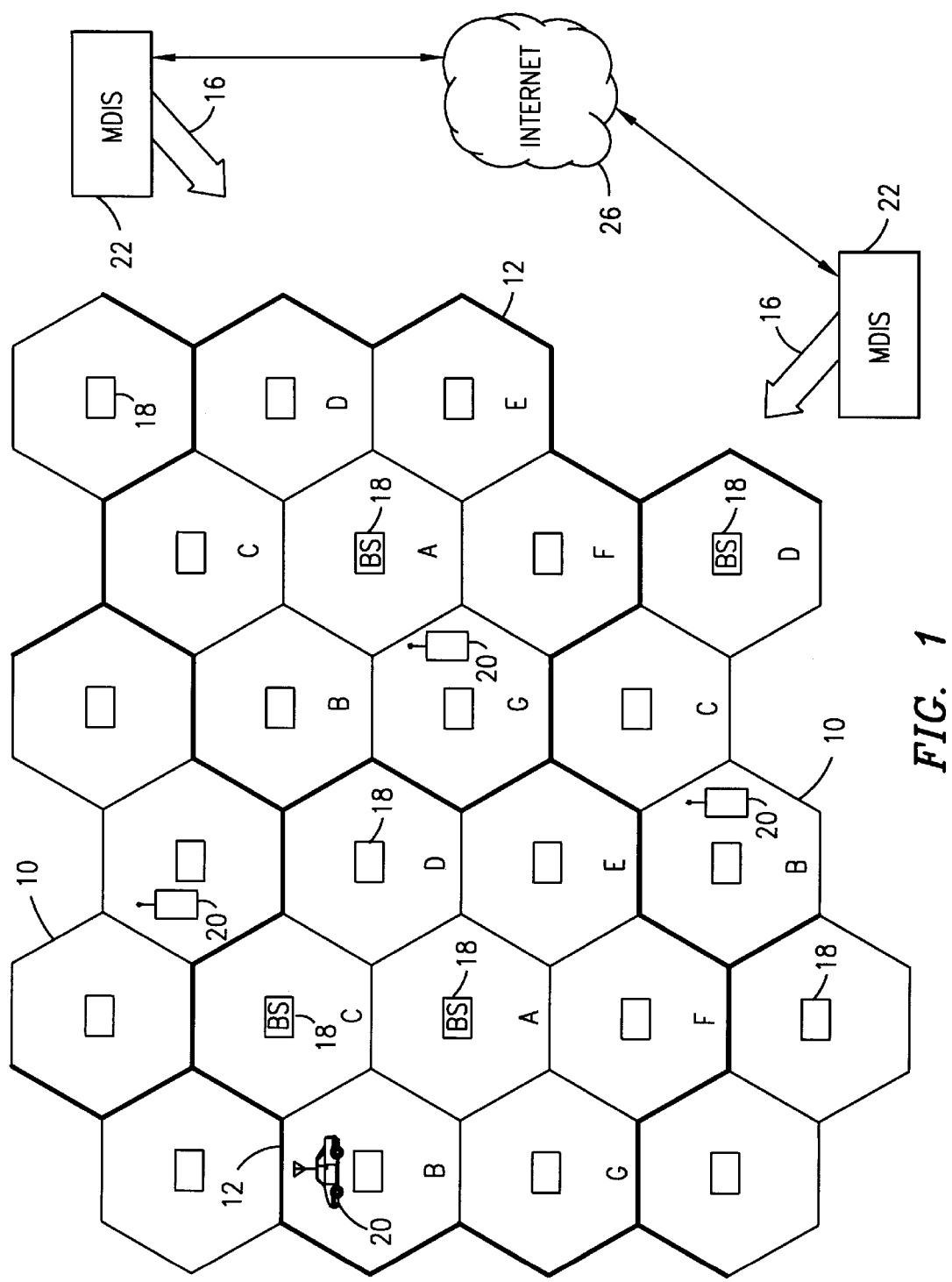
FIG. 1 is a cell diagram schematically illustrating an exemplary frequency plan assignment within a frequency re-use cellular telephone system.

Reference is now made to FIG. 1 wherein there is illustrated an exemplary cell structure and frequency plan assignment for use in a wireless (cellular) data communications network. An arbitrary geographic region (hereinafter "the service area") is divided into a plurality of contiguous cells 10 schematically represented by hexagons. The cells 10 are then grouped into clusters 12 (outlined in bold to ease recognition). For example, in a conventional seven layer frequency plan such as that illustrated in FIG. 1, each cluster 12 includes seven cells 10(1)–10(7). It will, of course, be understood that each cluster 12 may have more or less cells 10 as required by the selected frequency re-use plan.

The available frequencies in the cellular frequency band are divided in accordance with the frequency re-use plan into frequency groups, with the frequency groups assigned amongst the cells 10 of each cluster 12 such that the radio frequencies of the cellular band are re-used in each cluster. For example, in a cell structure having seven cells 10 per cluster 12 like that shown in FIG. 1, there are seven frequency groups identified and differentiated from each other by the alphabetic labels "A" through "G" corresponding to the cells 10(1)–10(7), respectively. Thus, each cell 10(1) in the service area is assigned the use of at least one radio frequency of the cellular band in frequency group A, each cell 10(2) is assigned use of at least one radio frequency of the cellular band in frequency group B, and so on up to each cell 10(7) being assigned use of at least one radio frequency of the cellular band in frequency group G.

It will be noted that in such a frequency re-use plan, adjacent cells are typically not assigned use of the same frequency. Re-use of an identical frequency in the service area is preferably made with a separation of at least more than one cell 10 (i.e., in a different cluster 12) along with a regulation of broadcast power from each cell to constrain radio propagation substantially within the cell area. Furthermore, it will be noted that where multiple frequencies are assigned to each group A–G, typically no one cell 10 would utilize adjacent frequencies in the cellular band. Adjacent frequencies are preferably assigned no closer than one cell 10 away from each other. By arranging the cells 10 in clusters 12 as shown in FIG. 1, regulating broadcast power of communications within the cell as mentioned above, and further by assigning frequencies in the fashion mentioned above, the likelihood of interference is reduced while simultaneously providing effective cellular communications services across a very large service area.

Each of the cells 10 in a cellular telephone system such as that illustrated in FIG. 1 includes at least one base station (BS) 18 configured to facilitate radio frequency communications with mobile stations 20 moving throughout the service area. The base stations 18 are illustrated as being positioned at or near the center of each of the cells 10. However, depending on geography and other known factors, the base stations 18 may instead be positioned at or near the periphery of, or otherwise away from the centers of, each of the cells 10. In such instances, the base stations 18 may broadcast and communicate with mobile stations 20 located within the cells 10 using directional rather than omni-directional antennas. The base stations 18 are connected by communications links (generally shown by arrow 16) to at least one mobile date intermediate system (MDIS) or data router 22 operating to control the operation of the system for providing cellular communications with the mobile stations 20. Each base station 18 includes at least one transceiver (not shown) capable of operating independently on different radio frequencies of the particular groups A–G assigned to the cell. Operation of the router 22 and base stations 18 to provide wireless (cellular) data communications service is well known to those skilled in the art, and will not be described. The routers 22 provide connectivity through the base stations and between the mobile stations 20 and some fixed infrastructure network 26 (such as the Internet).

The selected frequency re-use plan may support either symmetric or asymmetric frequency assignments to the groups A–G. With symmetric frequency assignment, each downlink frequency channel assigned has a corresponding uplink frequency channel. Examples of wireless data communications networks implementing symmetric frequency assignment are the cellular digital packet data (CDPD) network and the AT&T pACT'97 system. In an asymmetric frequency assignment, on the other hand, the one-to-one correspondence between downlink and uplink frequency channels is broken. Accordingly, there may exist plural downlink frequency channels assigned to correspond with only a single uplink frequency channel. An example of a wireless data communications network implementing an asymmetric frequency assignment is the narrowband personal communications service (NPCS).

In a wireless data communications network, the downlink is, ordinarily, permanently "keyed". By this it is meant that the carrier is active and a broadcast is being made at all times, even when the data stream contains no information intended for reception by a mobile station 20. Because of the constant broadcast, an increased risk of unacceptable levels of interference with frequency re-use arises. Accordingly, a multi-level time/frequency re-use plan is implemented on the downlink. For symmetric frequency assignment the same multi-level plan is then implemented on the uplink. For asymmetric frequency assignment, on the other hand, similar level uplink frequency/time assignment is not preferred as it may require unacceptable time division re-use to be applied against the downlink resulting in a significant amount of lost channel capacity and increased latency of transmitted communications.

It is recognized that, unlike downlink transmissions, uplink transmissions are naturally bursty in character, and thus a continuous channel for transmission is not required. This means that the uplink is less susceptible to unacceptable levels of interference than the keyed downlink. Consequently, a lower level time/frequency re-use plan may be implemented on the uplink than on the downlink. This is particularly helpful with respect to communications systems implementing an asymmetric frequency assignment as a more efficient, lower level, time/frequency re-use plan may be successfully used with the single frequency uplink than with the multi-frequency downlink.

Taking, for example, the NPCS wireless data communications network implementing an asymmetric frequency assignment with three downlink frequency channels and one uplink frequency channel, interference concerns dictate the use of a twelve level frequency/time re-use plan on the downlink. Conventionally, this selection would require a corresponding twelve level frequency/time re-use plan on the uplink. As the uplink includes only a single frequency channel, the application of a twelve level re-use plan requires 12x time re-use. The use of corresponding 12x time re-use on the downlink is highly undesirable because the downlink only requires a 4x time re-use (in combination with 3x frequency re-use) to achieve twelve levels. The enforcement of a 12x time re-use on the downlink then would result in significant capacity losses as well as an increase in message transmission latency. With consideration given, however, to the naturally bursty character of the uplink transmissions, a continuous channel that would be supplied with 12x time re-use is not required. A lower level time re-use, such as 4x time re-use to match the optimum time re-use for the three frequency channel downlink, may then be selected. An issue arises then as to how this may be successfully implemented.

The selection of a lower level time re-use on the uplink will result in an increase in interference as more mobile stations access fewer logical channels on the uplink. To address this concern, the present invention further implements channel puncturing on the uplink. Channel puncturing marks a specific logical channel on the uplink as busy or reserved for a specific duration of time within a known time window. By deliberately preventing mobile station originated transmissions within the specified duration of time, increases in the periods of silence on the uplink are experienced and a reduction in the likelihood of interference results. This produces an effective increase in the level of re-use on the uplink channel.

Figure 2:
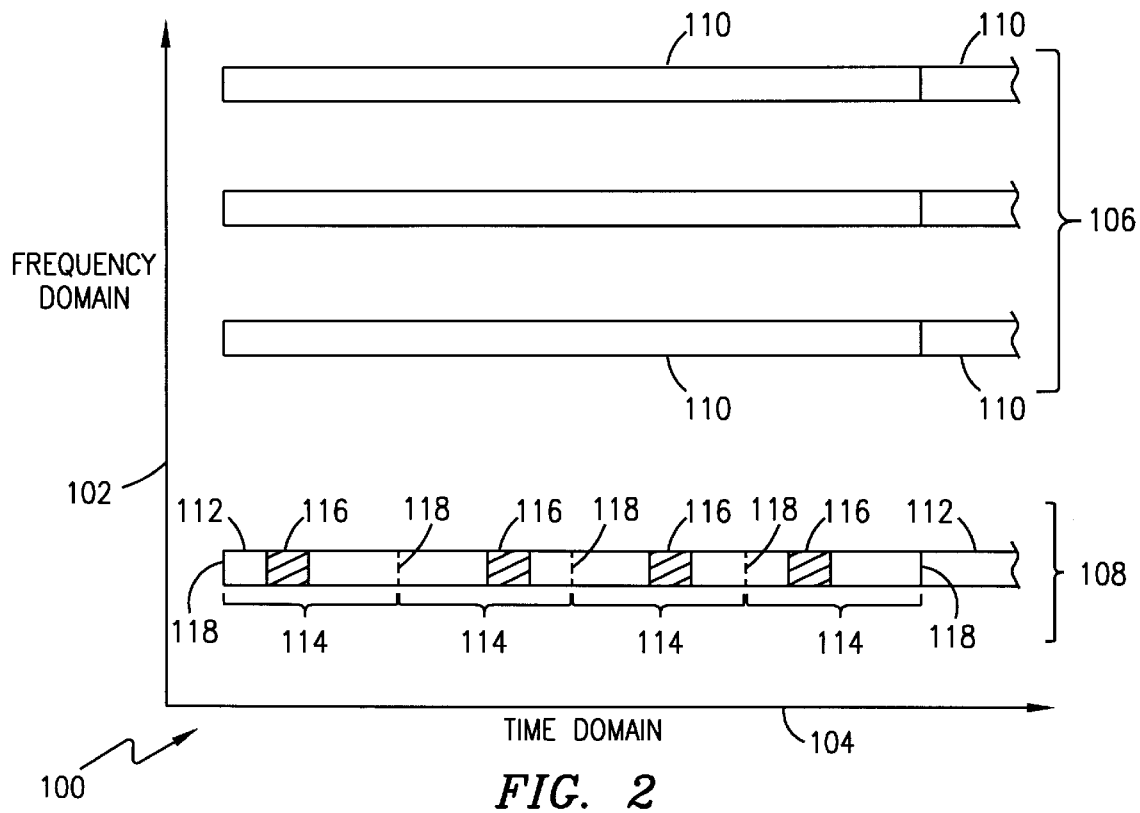
FIG. 2 is a graph illustrating a channel puncturing procedure in accordance with the present invention.

Reference is now made to FIG. 2 which shows a graph 100 illustrating a channel puncturing procedure in accordance with the present invention. The y-axis 102 of the graph 100 references the frequency domain, while the x-axis 104 references the time domain. With respect to the frequency domain, and in accordance with the NPCS wireless data communications network implementing an asymmetric frequency assignment, three downlink frequency channels 106 and one uplink frequency channel 108 are illustrated. For a twelve level frequency/time re-use plan, each of the three downlink frequency channels 106 is partitioned into four repeating time slots 110 (only one completely shown). The single uplink frequency channel 108 also implements 4× time re-use, and is similarly partitioned into four repeating time slots 112 (also only one completely shown). With respect to each time slot 112 on the single uplink frequency channel 108, it is further partitioned into a plurality of channel puncturing windows 114. At one randomly selected location within each channel puncturing window 114, where the randomly selected location varies from window to window and from cell to cell, the single uplink frequency channel 108 may be marked as busy or reserved at a puncturing time 116 lasting for a specific duration of time that is either commensurate with a single mobile station transmission or of a randomly selected length bounded by an upper and lower limit. This is illustrated in FIG. 2 as the positioning of the puncture time 116 within the various windows 116 and with respect to a boundary 118 of each window differs from window to window. Furthermore, although not specifically illustrated in FIG. 2, the position of the puncturing time 116 in corresponding windows of reused uplink frequency channels differs (i.e., cell to cell differentiation) due to the effects of the random selection process implemented at each base station.

The selection of a random location (window to window, and cell to cell) for puncturing is made to ensure that average interference experienced in all cells is reduced and permanent pockets of unacceptable interference do not occur. This approach further minimizes message latency because the worst case transmission delay is the length of a communications transmission, rather than the delay resulting from a 12× time re-use. The limits of the randomly selected channel puncturing window 114 and duration of time 116 are determined and set by the network service provider. In geographic regions that are subject to high propagation attenuation constants, a longer window 114 with relatively shorter durations of time 116 may be selected. For regions with higher instances of interference, longer durations of time 116 within relatively shorter windows 114 may be selected. In any case, however, by selecting an appropriate duty cycle defined by the sizes of the channel puncturing window 114 and duration of time 116, the network service provider may effectively engineer any level of re-use that is needed (for example, to lower and match re-use on another corresponding frequency channel).

Figure 3:
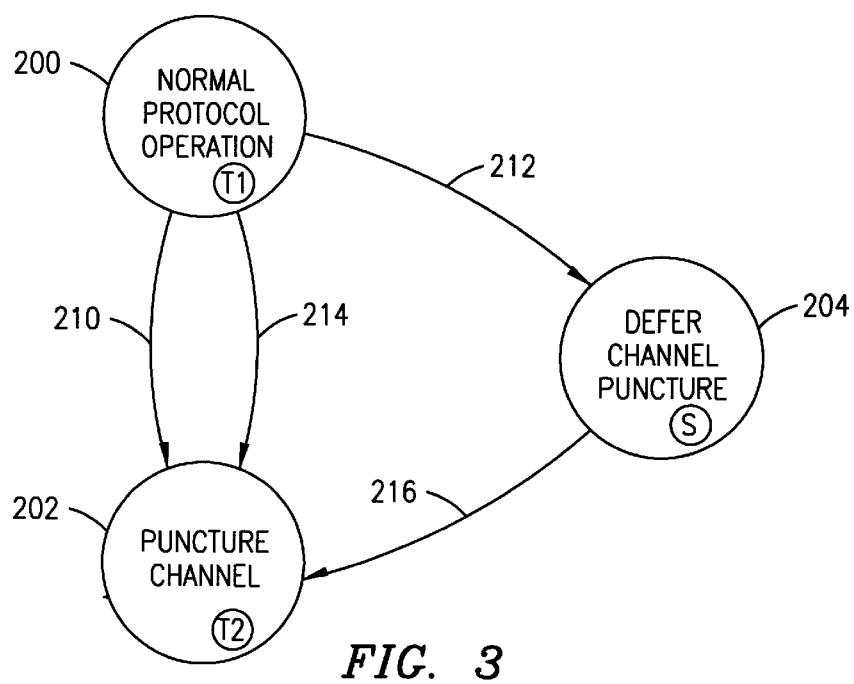
FIG. 3 is a state transition diagram for base station operation to effectuate the channel puncturing procedure in accordance with the present invention.

Reference is now made to FIG. 3 wherein there is shown a state transition diagram for base station operation to effectuate the channel puncturing procedure in accordance with the present invention. The base station normally operates in a normal protocol operation state 200. While in the state 200, the conventional procedures are followed for marking the uplink as busy or reserved in accordance with the implemented multiple access protocol. Furthermore, in this state 200 uplink reservation requests for pending service are handled in accordance with a maintained queue. The base station remains in state 200 until a randomly set channel puncturing timer (T1) started at the boundary of the channel puncturing window (114, see FIG. 2) expires. If the uplink is not then being utilized, the base station transitions 210 to a puncture channel state 202. If, on the other hand, the base station is being utilized, or if one or more uplink reservation requests are queued for pending service, the base station transitions 212 to a defer channel puncture state 204. Upon entry into the puncture channel state 202, the base station sets a timer (T2) for the duration of time (puncturing time 116, see FIG. 2) for channel puncturing, and marks the uplink as being busy or reserved in order to prevent mobile station transmissions from occurring. The timer (T2) may measure either a predetermined time period for puncturing duration, or a randomly selected time period bounded by upper and lower limits. When the timer (T2) expires, the base station transitions 214 back to the normal protocol operation state 200. Upon entry into the defer channel puncture state 204, the base station waits for a current service connection on the uplink to be completed. Any other uplink reservation requests queued for pending service are then stored (S), and the base station transitions 216 to the puncture channel state 202.

The channel puncturing procedure of the present invention may advantageously be implemented in connection with many existing packet data systems regardless of the access protocol being implemented on the uplink. The reason for this is that many of the access protocols include a mechanism for transmitting a busy or a reservation flag. In accordance then with the present invention, this flag is sent not only when the busy or reserved condition is satisfied, but also when a transition is made to the puncture channel state 202 and the uplink is closed for all mobile station initiated transmissions.

In general, packet data multiple access protocols fall into two categories: contention protocols (such as carrier sense multiple access—CSMA); and packet reservation protocols (such as packet reservation multiple access—PRMA). Contention protocols usually provide a small contention window in which access is permitted. If a single mobile station transmission is received, control flags on the forward channel inform remaining mobile stations not to transmit thus allowing the successful mobile station to have dedicated access to the reverse channel. If multiple mobile stations transmit, but none are received, the bandwidth goes wasted. Packet reservation protocols perform bandwidth management in one instance by polling for mobile stations who wish access to the reverse channel, and then dedicating the channel to the responding mobile station. In another instance the protocol provides a small contention window in which reservation requests are transmitted by mobile stations, with the reverse channel being dedicated for use by the mobile station whose reservation request is approved.

Each of these protocols employ control flags that are broadcast on the forward (i.e., downlink) channel to inform mobile stations of the status of the reverse (i.e., uplink) channel. The present invention advantageously utilizes these flags not only to convey information regarding whether the reverse channel is busy or is reserved for use of a certain mobile station, but also to indicate a randomly selected puncture time during which transmissions from all receiving mobile stations are prohibited.

Figure 4:
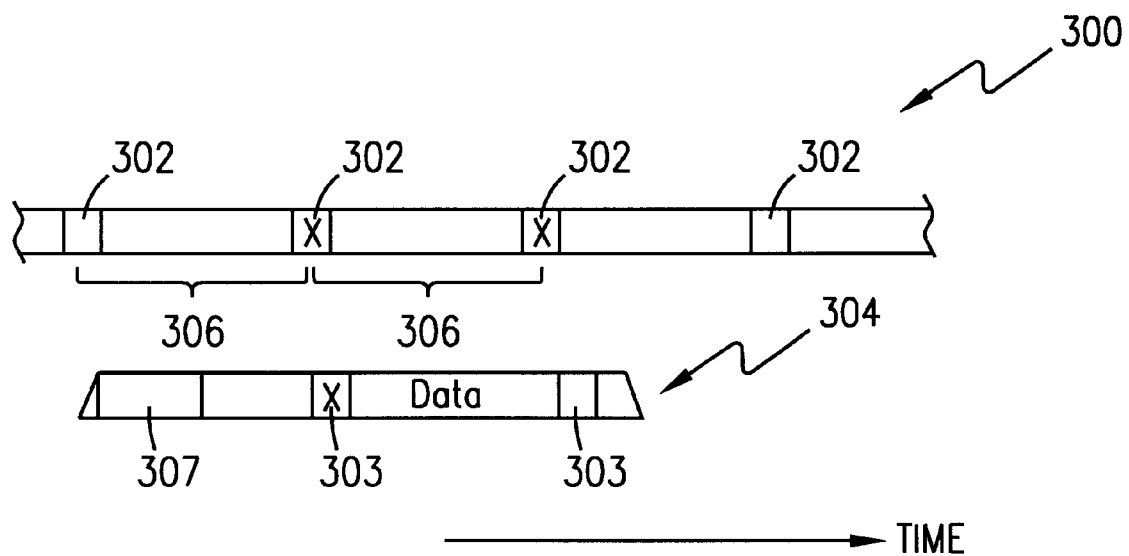
FIG. 4 is a forward/reverse channel timing diagram for a carrier sense multiple access type contention protocol which supports reverse channel puncturing.

Reference is now made to FIG. 4 wherein there is shown a forward/reverse channel timing diagram for a carrier sense multiple access type contention protocol. The forward channel 300 transmission includes control flags 302 transmitted at regular intervals. These control flags 302 delineate the reverse channel 304 (which also includes control flags 303) into a plurality of reverse channel collision windows 306. A mobile station is permitted to initially transmit in any of the reverse channel collision windows 306 provided the preceding forward channel control flag 302 indicates that the channel is idle. Furthermore, the mobile station may set the reverse channel control flag 303 to busy (as indicated by an "X") to indicate that the message cannot be broadcast within a single collision window 306. Any transmission 307 by the mobile station in an idle collision window 306 must end before the next forward channel control flag 302 transmission such that the base station may set the next forward channel control flag 302 to busy (as indicated by an "X"), and thus allow the mobile station to continue message transmission during the subsequent collision window 306.

In accordance with the present invention, the forward channel control flag 302 is set not only when the reverse channel 304 is busy, but also on a random basis as determined by the expiration of the channel puncturing timer T1 (see FIG. 3) to indicate the start of a channel puncturing event during which no receiving mobile stations may access the reverse channel. For the predetermined or random duration of the channel puncturing event, as measured by the timer T2 (see FIG. 3), the forward channel control flag 302 remains set.

Figure 5:
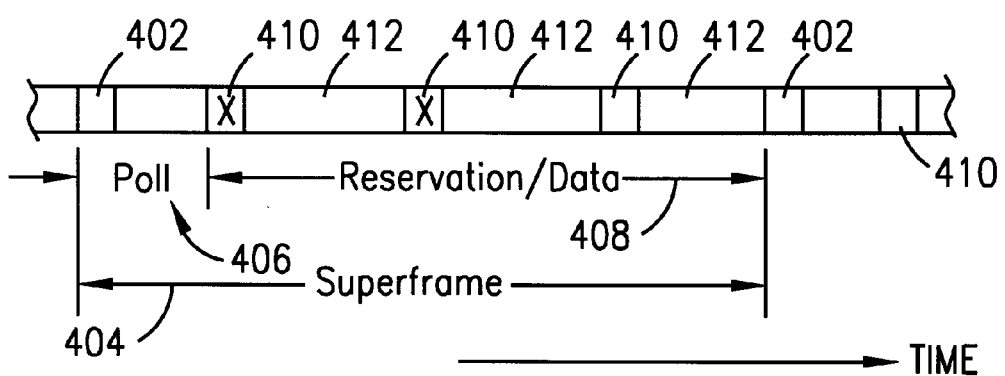
FIG. 5 is a forward channel timing diagram for a packet reservation multiple access type contention protocol which supports reverse channel puncturing.

Reference is now made to FIG. 5 wherein there is shown a forward channel timing diagram for a packet reservation multiple access type contention protocol. The forward channel 400 transmission includes synchronization words 402 transmitted at regular intervals to define a superframe 404. Each superframe 404 includes a polling interval 406 and a reservation/data interval 408. The forward channel 400 transmission further includes reservation flags 410 transmitted at regular intervals during the reservation/data interval 408. During the polling interval 406, a mobile station may make a transmission on the reverse channel (not shown) announcing that it has outstanding data packets to deliver and requesting reservation of the reverse channel. If the base station receives the request and grants access, the reservation flag 410 is set (as indicated by the "X"), and the mobile station is given access, without competition by other mobile stations, to the reverse channel for message transmission during data periods 412 of the reservation/data interval 408 following set flags 410.

In accordance with the present invention, the reservation flag 410 is set not only when the reverse channel has been reserved for mobile station use, but also on a random basis as determined by the expiration of the channel puncturing timer T1 (see FIG. 3) to indicate the start of a channel puncturing event during which no receiving mobile stations may access the reverse channel. For the predetermined or random duration of the channel puncturing event, as measured by the timer T2 (see FIG. 3), the reservation flag 410 remains set.

By using the channel puncturing procedure of the present invention, a channel which would require a relatively high level of re-use (such as twelve level frequency/time re-use) in order to provide acceptable interference levels, may instead be implemented with a lower level of re-use (such as four level frequency/time re-use) due to the advantageous interference lowering qualities of channel puncturing. Thus, channel puncturing would allow a lower level time division scheme to be implemented when a communications protocol designed for a symmetric frequency assignment design is utilized by a wireless data communications network having an asymmetric frequency assignment design. In a particular example, channel puncturing allows the asymmetric frequency assignment design of the NPCS system to support the narrowband two-way paging and messaging protocol of the pACT'97 system.

Although the method and apparatus of the present invention has been illustrated in the accompanying Drawings and described in the foregoing Detailed Description, it will be understood that the invention is not limited to the embodiment(s) disclosed, but is capable of numerous rearrangements, modifications and substitutions without departing from the spirit of the invention as set forth and defined by the following claims.

What is claimed is:

1. With respect to a multiple access communications protocol where access to a reverse channel is controlled by the state of a forward channel parameter, a method comprising the steps of:

setting the forward channel parameter whenever the reverse channel has been designated as reserved for a certain user access to preclude other users from accessing the reverse channel; and setting the forward channel parameter when the reverse channel is not designated as reserved for certain user access to preclude all users from accessing the reverse channel and reduce interference on the reverse channel;

wherein the step of setting the forward channel parameter to preclude all users from accessing the reverse channel comprises the step of setting the forward channel parameter at randomly selected instances other than when set in connection with the reservation made for certain user access.

2. The method as in claim 1 wherein each setting of the forward channel parameter at randomly selected instances lasts for a predetermined time period.

3. The method as in claim 1 wherein each setting of the forward channel parameter at randomly selected instances lasts for a randomly selected time period bounded by upper and lower limits.

4. The method as in claim 1 wherein the forward channel parameter comprises a flag that when set is indicative of the reverse channel being busy with a communication from the certain user.

5. The method as in claim 4 wherein the multiple access communications protocol is a carrier sense multiple access protocol and the flag comprises a busy/idle flag.

6. The method as in claim 1 wherein the forward channel parameter comprises a flag that when set is indicative of the reverse channel being reserved for a communication from the certain user.

7. The method as in claim 6 wherein the multiple access communications protocol is a packet reservation multiple access protocol and the flag comprises a reservation identifier.

8. A cellular communications system comprised of a plurality of cells, comprising:

a base station for each cell which supports a multiple access communications protocol where access to a reverse channel is controlled by the state of a forward channel parameter broadcast from the base station, the base stations setting the forward channel parameter whenever the reverse channel has been designated as reserved for a certain user access in the cell to preclude others users in the cell from accessing the reverse channel, and the base stations further setting the forward channel parameter each at certain selected times when the reverse channel is not designated as reserved for certain user access to preclude all users in the cell from accessing the reverse channel and reduce interference on the reverse channel, wherein the certain selected times are randomly selected times by each base station, the forward channel parameter being set at each randomly selected time other than when set in connection with the reservation made for certain user access.

9. The base station as in claim 8 wherein each randomly selected time lasts for a predetermined time period.

10. The base station as in claim 8 wherein each randomly selected time lasts for a randomly selected time period bounded by an upper and lower limit.

11. The base station as in claim 8 wherein the forward channel parameter comprises a flag that when set is indicative of the reverse channel being busy with a communication from the certain user.

12. The base station as in claim 11 wherein the multiple access communications protocol is a carrier sense multiple access protocol and the flag comprises a busy/idle flag.

13. The base station as in claim 8 wherein the forward channel parameter comprises a flag that when set is indicative of the reverse channel being reserved for a communication from the certain user.

14. The base station as in claim 13 wherein the multiple access communications protocol is a packet reservation multiple access protocol and the flag comprises a reservation identifier.

15. A base station having a plurality of operating states including:

a normal multiple access protocol operation state wherein access to a reverse channel is controlled by the state of a forward channel parameter broadcast from the base station, the base station setting the forward channel parameter whenever the reverse channel has been designated as reserved for a certain user access in the cell to preclude others users in the cell from accessing the reverse channel; and a puncture channel state wherein access to the reverse channel is also controlled by the state of a forward channel parameter broadcast from the base station, the base station setting the forward channel parameter when the reverse channel is not designated as reserved for certain user access to preclude all users in the cell from accessing the reverse channel and reduce interference on the reverse channel; and the base station further including means for transitioning between the normal multiple access protocol operation state and the puncture channel state at certain selected times, wherein the certain selected times are randomly selected times, the forward channel parameter being set at each randomly selected time other than when set in connection with the reservation made for certain user access.

16. The base station as in claim 15 wherein each randomly selected time lasts for a predetermined time period.

17. The base station as in claim 15 wherein each randomly selected time lasts for a randomly selected time period bounded by an upper and lower limit.

18. The base station as in claim 15 further including:

a defer channel puncturing state to delay entry into the channel puncturing state; and the base station further including:

means for transitioning from the normal multiple access protocol operation state to the defer channel puncturing state at the certain selected times if the certain user is accessing the reverse channel; and means for transitioning from the defer channel puncturing state to the channel puncturing state when certain user access terminates.

19. The base station as in claim 15 wherein the forward channel parameter comprises a flag that when set is indicative of the reverse channel being busy with a communication from the certain user.

20. The base station as in claim 19 wherein the multiple access communications protocol is a carrier sense multiple access protocol and the flag comprises a busy/idle flag.

21. The base station as in claim 15 wherein the forward channel parameter comprises a flag that when set is indicative of the reverse channel being reserved for a communication from the certain user.

22. The base station as in claim 21 wherein the multiple access communications protocol is a packet reservation multiple access protocol and the flag comprises a reservation identifier.

* * * * *